United States Patent Office 3,770,672
Patented Nov. 6, 1973

3,770,672
PASTE FOR GUMMED TAPE AND PROCESS FOR PRODUCING THE SAME FROM HYDROLYZED STARCH
Atsushi Yoshizawa and Takaji Kitazawa, Shizuoka, Japan, assignors to Nihon Rika Seishi Kabushiki Kaisha, Tokyo, Japan
No Drawing. Filed Feb. 10, 1971, Ser. No. 114,342
Int. Cl. C08f 15/00
U.S. Cl. 260—17.4 ST          13 Claims

ABSTRACT OF THE DISCLOSURE

A process for producing a gummed tape paste having a remoistenable adhesive property which comprises copolymerizing a decomposition product obtained by the enzymatic decomposition of starch with a vinyl monomer and the gummed tape paste thus produced.

BACKGROUND OF THE INVENTION

(1) Field of the invention

The present invention is concerned with a paste applicable to gummed tape. Specifically, it relates to a process for producing a gummed tape paste having a remoistenable adhesive property which comprises copolymerizing a decomposition product obtained by the enzymatic decomposition of starch with a vinyl monomer and the gummed tape paste thus produced.

(2) Description of prior art

Hitherto, animal glue has been used as the raw material for gummed paste, but animal glue has many disadvantages in that it has low temperature characteristics, its adhesive characteristics are greatly limited by the conditions for use, it smells bad and the cost thereof fluctuates greatly. Accordingly, a stable glue cannot be obtained. Furthermore, for improving the properties of gummed tape paste, it has usually been known to add various aqueous resin solutions such as glue or dextrin, but the gummed tape pastes thus improved, exhibit large fluctuations in characteristics and, hence, it is difficult to produce gummed tapes capable of being widely employed. The inventors have previously found a method for improving gummed tapes by blending a synthetic polymer and dextrin (see, for example, Japanese Pat. No. 415,245). However, the blend of dextrin and the synthetic polymer is extremely expensive to produce.

Recently, various kinds of adhesive machines have been used, the kinds of substrates have been widened, the working has been sped up, and also improved machines have been employed in various fields empolying gummed tapes, such as, sealing cases made of corrugated sheets and the correction, connection of veneer after drying and cracking prevention of green veneers in plywood-manufacturing factory. Accordingly, gummed tapes have been required to have many characteristics.

First of all, accompanied by the employment of automatic sealing machines for corrugated container boxes, the machine becomes precise and the gummed tapes are exposed to such severe conditions as low wetting temperature and instantaneous open time at the start of the machine. Moreover, the shapes and the surface conditions of the corrugated container boxes to be treated by the same machine are not constant; e.g., corrugated container boxes having different shapes are treated by the same machine and the surfaces of the recovered corrugated container boxes are coarser than those of fresh cases. Thus, the gummed tapes are required to exhibit different adhesive behaviors in each case. In such case, gummed tapes having paste capable of being activated at a low temperature, showing a short setting time, and having a high tack are necessary.

Then, among the woods from the South Sea Islands used in plywood-manufacturing factories, the woods from Borneo have low density, exhibit course cut surfaces by a rotary lathe and also exhibit a large contraction coefficient during the drying process. Further, when a gummed tape is used for preventing wood such as green veneer from being cracked, an adhesion rupture is apt to occur partially due to the contraction strain between the green veneer and the gummed tape. Therefore, in such case, a gummed tape which causes no adhesion rupture by the contraction strain between the green veneer and the tape is required.

Furthermore, a gummed tape used in a tray system is required to have a large initial adhesive strength.

Also, recently, the automation and speed up of the pripress or hot press in plywood-manufacturing factories have advanced and in particular, the speed of releasing the pressure of a hot press has advanced rapidly together with the employment of multistage type hot press. In such a case, there is a danger that the gummed tape adhered causes adhesion hindrance by the heat softening of the adhesion layer in a moistened condition. Thus, the evaluation of gummed tapes has hitherto been made based on the adhesive strength thereof at room temperature but at present the adhesive strength of gummed tapes at high temperatures in a hot press is only one factor for determining the strength of adhering plywoods.

Therefore, the production of the gummed tapes provided with the above-mentioned various properties are now desired and, in addition, it is also desired to improve the step of producing gummed tapes for the large demand of same.

In this specification, the term "gummed tape" means an adhesive tape prepared by applying a water-soluble adhesive to one surface of a kraft paper, which is mainly used in the fields of packing and plywood manufacture and the term "gummed tape paste" means the adhesive used for manufacturing such gummed tape.

SUMMARY OF THE INVENTION

It is, therefore, an object of this invention to provide a gummed tape provided with the aforesaid various properties required at present.

Another object of this invention is to provide a process for producing the above-mentioned gummed tape.

Still another object of this invention is to improve the production step for the gummed tape by conducting the step continuously.

Accordingly, these and other objects can be attained by using as the gummed tape paste a copolymer of a product prepared by the enzymatic decomposition of starch with an enzyme and a vinyl monomer.

DETAILED DESCRIPTION OF THE INVENTION

The hydrolyzed product of starch to be contained in the gummed tape paste used in the past as a modifier for an adhesive, has been roasted dextrin obtained by a wet-type or dry-type roasting method. But, such method is accompanied with the disadvantage that the selection of starch as the raw material is limited to a narrow few, the starch is not hydrolyzed uniformly, the extent of hydrolysis is uneven, and the hydrolyzed product is apt to cause a returning phenomenon; that is, it is apt to increase the viscosity in the course of time.

On the other hand, in the starch decomposition process with an enzyme according to the present invention, any kind of starch may be used as the raw material, starch is hydrolyzed uniformly and the extent of the hydrolysis is constant throughout the starch without being influenced by the kind and amount of the enzyme to be employed. In addition, the hydrolyzed product causes no returning phenomenon.

Thus, in the present invention, it is possible to adjust desirably the extent of hydrolysis and the degree of branching by the kind and amount of enzyme employed and the content of amylose and amylopectin in the starch used as the raw material. Accordingly, in the copolymerization reaction with a vinyl monomer, a sufficient grafting efficiency can be obtained.

Moreover, because the hydrolysis by an enzyme in the present invention is conducted in an aqueous suspension system of starch, the progress and stop of the hydrolysis can be readily controlled by the hydrolyzing temperature, the pH of the suspension, and the kind of salts dissolved in the reaction system. Also, the solution of the hydrolyzed product may be supplied as it is to the copolymerization reaction with a vinyl monomer in an aqueous solution system, which results in providing a continuous process for producing gummed tape pastes.

The copolymer of the hydrolyzed product of starch and a vinyl monomer is a graft copolymer or a block copolymer and the copolymerization reaction is a radical polymerization.

The composition ratio of the hydrolyzed product of starch to the vinyl monomer in the copolymerization reaction is preferably 8:1 to 1:1 ratio by weight. If the ratio is outside this range, the balance of adhesive strength is greatly reduced, which makes the copolymer improper.

As the vinyl monomer, there may be employed acrylamide or acrylic acid but the vinyl monomer may be used together with methacrylic acid, methyl acrylate, ethyl acrylate, methyl methacrylate, ethyl methacrylate, acrylonitrile, styrene, ethylene, or propylene for providing the properties of each homopolymer to the copolymer. For example, the use of acrylonitrile provides heat resistance, the use of ethyl acrylate gives softness, and the use of methyl methacrylate or styrene lends toughness to the copolymer.

The functional group, COOH of acrylic acid and/or the functional group, $CONH_2$ of acrylamide, forms a good adhesive bond between the copolymer and the substrate. Furthermore, by converting a part of the aforesaid functional group in the copolymerization product to an alkali metal salt, an alkaline earth metal salt or an amine salt thereof, the adhesive strength of the paste, cohesive strength, and the affinity thereof corresponding to the properties of the substrate and the surface conditions of the material may be improved. Still further, by providing to the reaction product proper cross-linking by causing intramolecular cross-linkage with a metal compound such as magnesium chloride, calcium chloride, lithium chloride, or sodium aluminate, the adhesive strength thereof can be increased. In addition, the water resistance and heat resistance as gummed tape for plywoods can be also improved. The netting of the solution of the copolymer must be so conducted that the solution causes no gelation. The amount of the metal compound to be used is 1.0–10.0% by weight in magnesium chloride, 1.0–10.0% by weight in calcium chloride, 1.0–10.0% by weight in lithium chloride, and 0.1–1.0% by weight in sodium aluminate. Also, two or more of these compounds may be used together.

As the enzyme used in the hydrolysis in this invention, there are mainly used alpha-amylase and beta-amylase. However, other enzymes for hydrolyzing starch may also be employed.

Thus, in the present invention, the viscosity of the solution of the copolymer is stable, no troubles occur in the coating operation, the yield of paste is increased, the stability of the solution during preservation is good and the solution can be preserved for a long period of time in the solution state. Hence, the operation can be improved.

The starch (as the raw material), such as corn, sweet potato, white potato, tapioca, etc., and the vinyl monomer, such as acrylamide or acrylic acid may be readily managed as well as the control of the processing steps of the materials, such as the hydrolysis of starch by the enzyme, the copolymerization reaction with the vinyl monomer, and the like. Further, because the properties of each material and the behavior of the material are clear, the characteristics can be clearly controlled.

Accordingly, by employing the gummed tape having the characteristics and in which the copolymer is used, the faults of the conventional gummed tapes can be overcome.

A better understanding of the present invention will be obtained from the following examples which are merely illustrative and not limitative of the present invention.

Example 1

A slurry of 276 parts by weight of sweet potato starch in 1214 parts by weight of water was placed in a reaction chamber equipped with a heating jacket, a condenser, and a stirrer. While stirring the system, the pH of the slurry was adjusted to 6.0±0.5 with an aqueous NaOH solution and then 0.2816 part by weight of a starch decomposing enzyme (alpha-amylase recovered from *Bacillus subtitlis*) was added to the slurry. The slurry containing the enzyme was heated at a rate of 1–2° C./min., whereby the hydrolysis of the starch and the gelatinization thereof were completed. Then, the temperature of the system was increased up to 95° C. and after maintaining the system at the temperature for 5 minutes, the system was cooled. When the temperature of the hydrolyzed product lowered to 60° C., 53 parts by weight of acrylamide was added and then 0.7 part by weight of potassium peroxide was added to the mixture as a radical polymerization catalyst. Water of 70° C. was circulated through the heating jacket of the reaction chamber. The copolymerization reaction was finished after about 60 minutes. As the temperature of the product increased to 90° C. by the heat of reaction, the product was cooled to 70° C. and the pH of the reaction product solution was adjusted to 7.0±0.5, whereby a portion of the carboxyl groups in the product were converted into the sodium salt. In this case, the viscosity of the reaction product solution was 9,000 cps. when measured by means of a rotary viscometer at a rate of 10 r.p.m. and a temperature of 55° C. The product solution was applied to non-bleached kraft paper by an ordinary manner and dried to provide a gummed tape. By measuring the adhesive properties of the tape, etc., the results shown in the following table were obtained:

The coated amount was 28 g./m.$^2$ by dry weight.

Test conditions:
    Temperature: 20° C.
    Relative humidity: 65%
    Moistening: 15 g./m.$^2$
    Water temperature: 15° C.
    Adhesive strength: g./50 mm. width
    Material tested was a corrugated contained box
    Test was conducted by the 180° stripping method.

TABLE 1
[Open time and adhesive strength]

| Open time (sec.) | 2.5 | 5 | 10 | 20 | 30 | 40 | 50 | 60 |
|---|---|---|---|---|---|---|---|---|
| Tape of this example | 1,000 | 1,200 | 1,400 | 1,400 | 1,400 | 1,400 | 1,400 | 1,400 |
| Commercially available tape | 400 | 600 | 800 | 800 | 600 | | | |

TABLE 2
[Surrounding temp. and adhesive strength]

| Surrounding temp. (° C.) | 0 | 5 | 10 | 15 | 20 | 25 | 30 | 35 | 40 |
|---|---|---|---|---|---|---|---|---|---|
| Tape of the example | 80 | 85 | 100 | 100 | 100 | 100 | 100 | 100 | 100 |
| Commercially available tape (control) | 0 | 5 | 60 | 80 | 85 | 90 | 90 | 90 | 90 |

TABLE 3
[Surrounding humidity and adhesive strength]

| Humidity (percent RH) | 20 | 30 | 40 | 50 | 60 | 70 | 80 | 90 | 100 |
|---|---|---|---|---|---|---|---|---|---|
| Tape of the invention | 100 | 100 | 100 | 100 | 100 | 100 | 100 | 100 | 100 |
| Commercially available tape (control) | 10 | 60 | 80 | 90 | 95 | 95 | 90 | 80 | 80 |

In Table 2 and Table 3, the numerical values of the adhesive strength higher than 80 indicate that the tape can be practically used.

Example 2

The same procedure of Example 1 was followed using as the raw material, the starch from white potato, corn, and tapioca in place of sweet potato starch. The compositions of the adhesives used in this invention are shown in the following table:

TABLE 4

| Sample No. | Starch | Amount of starch (part) | Amount of amylase (part) |
|---|---|---|---|
| A | White potato | 100 | Alpha-amylase 0.1. |
| B | Corn | 100 | Alpha-amylase 0.5. |
| C | Tapioca | 100 | Alpha-amylase 0.2. |
| D | Sweet potato and corn | 40/60 | Alpha-amylase 0.25. |

The adhesive strength of the gummed tape thus prepared was measured, the results of which are shown in the following table:

TABLE 5
[Open time and adhesive strength]

| Seconds | 2.5 | 5 | 10 | 20 | 30 | 40 | 50 | 60 |
|---|---|---|---|---|---|---|---|---|
| Sample: | | | | | | | | |
| A | 1,000 | 1,200 | 1,400 | 1,400 | 1,400 | 1,400 | 1,400 | 1,400 |
| B | 1,600 | 1,600 | 1,600 | 1,500 | 1,400 | 1,000 | | |
| C | 900 | 1,000 | 1,200 | 1,400 | 1,400 | 1,400 | 1,400 | 1,400 |
| D | 1,400 | 1,400 | 1,500 | 1,500 | 1,400 | 1,400 | 1,400 | 1,400 |
| Control [1] | 400 | 600 | 800 | 800 | 600 | | | |

[1] Commercially available gummed tape.

Example 3

Sweet potato starch was decomposed by alpha-amylase under the same conditions as Example 1 until a coloration with iodine showed blue-purple and then a mixture of the reaction product and acrylic acid in a monomer ratio of 5.5:1 by weight (acrylic acid) was subjected to a copolymerization reaction at 55° C. for 8 hours using ammonium persulfate in an amount of 0.63% of acrylic acid as the copolymerization catalyst. In this case, the viscosity of the reaction product solution of a concentration of 45% was 6,000 cps. when measured by means of a rotary viscometer at a rate of 10 r.p.m. and at 55° C.

A portion of the carboxyl groups in the reaction product was neutralized by aqueous ammonia to a pH of 0.2 whereby said portion of the carboxyl groups are converted into the ammonium salt, and then the solution was subjected to a cross-linking reaction with sodium aluminate in an amount of 0.6% of acrylic acid. The viscosity of the solution at a concentration of 45% was 8,000 cps. and it was applied to a non-bleached kraft paper (120 g./m.$^2$) with a dry coating weight of 28 g./m.$^2$, followed by drying to provide a gummed tape. The gummed tapes prepared were tested for their adhesive properties by means of an automatic taping machine; the results of which are shown in the following tables:

TABLE 6
[Open-time and adhesive strength]

| Open time (sec.) | 2.5 | 5 | 10 | 20 | 30 | 40 |
|---|---|---|---|---|---|---|
| Tape of the example | 1,400 | 1,400 | 1,400 | 1,400 | 1,400 | 1,400 |
| Commercially available tape (control) | 400 | 600 | 800 | 800 | 600 | |

TABLE 7
[Open time and creep function [1]]

| Open time (sec.) | 0.5 | 1.0 | 1.5 | 2.0 | 2.5 |
|---|---|---|---|---|---|
| Tape of the example | 0 | ⊚ | ⊚ | ⊚ | ⊚ |
| Contro tape | x | x | x | x | 0 |

[1] The slipping property of the tape when the tape was applied and pulled in the direction of the plane immediately thereafter.

NOTE.—⊚=no slip was observed; 0=slightly slipped; x=greatly slipped.

Example 4

Corn starch was decomposed by alpha-amylase under the same conditions as Example 1 until the coloration by iodine was red-brown. The pH of acrylic acid was adjusted with NaOH to 0.2 in neutralization value, the acrylic acid was mixed with the decomposition product obtained above so that the monomer ratio became 1:1, and then the copolymerization reaction was conducted for 10 hours at 45° C. using ammonium persulfate in an amount of 0.5% of acrylic acid as a copolymerization catalyst. To the reaction product solution was added sodium aluminate in an amount of 0.6% of acrylic acid so that the number of bonds (—O—Al—O—) became 0.7. The viscosity of the solution having a concentration of 35% was 9000 cps. at 50° C. (Sample A). To Sample A was further added magnesium chloride in an amount of 5% of acrylic acid to provide Sample B. Each of the adhesives, Sample A and Sample B thus obtained was applied to one surface of a non-bleached kraft paper of 52.6 g./m.$^2$ in a dry coating weight of 28 g./m.$^2$ followed by drying to provide a gummed tape for plywoods. The gummed tape was applied to the cross-section of a veneer and then the adhesive power thereof was tested, the results of which are shown in the following table:

TABLE 8
[Adhesive strength (g./10 mm. width)]

| Material | | Moisture content, percent | Adhesive strength | |
|---|---|---|---|---|
| Kind | | | (I)[1] | (II)[2] |
| Sample A Red lauan | | 40 | 140 | 180 |
| | | 100 | 160 | 90 |
| Sample B Red lauan | | 40 | 100 | 180 |
| | | 100 | 160 | 90 |
| Control sample,[3] Red lauan | | 40 | 40 | 80 |
| | | 100 | 90 | 70 |

[1] (I)=Initial adhesive strength.
[2] (II)=Water resisting adhesive strength.
[3] Control sample=Commercial available gummed tape (main component of the paste was polyvinyl alcohol).

In the above test, the initial adhesive strength was shown by the stripping resistance after 10 minutes since the application of the tape. A sampling from the unwinding roll and the tape was stripped at an angle of 180° and the water resisting adhesive strength was shown by the stripping resistance after 10 hours. A sampling from the unwinding roll and the tape was stripped at an angle of 180°.

Example 5

A mixture of corn starch and sweet potato starch in a ratio 1:1 by weight was decomposed by alpha-amylase until the coloration by iodine became red-brown. To the decomposition product was added a mixture of acrylamide and acrylic acid (7:3 in molar ratio) so that the ratio of the product to the mixture became 2:1. The mixture was subjected to a copolymerization reaction for 8 hours at 70° C. using ammonium persulfate as the copolymerization catalyst. The viscosity of the solution having a concentration of 30% was 12,000 cps. at 50° C.

The copolymer solution thus obtained was applied to a non-bleached kraft paper of 57.5 g.m./m.$^2$ in a dry coating weight of 30 g./m.$^2$ and dried to provide a gummed tape for plywoods. The final product could be used as an adhesive tape for veneers showing no adhesion hindrance at hot pressing.

In addition, when the present invention was practiced according to the manners shown in the following examples, the same results as in Examples 1–5 were obtained.

Example 6

The same procedure as Example 1 except that 47.7 parts by weight of acrylamide and 5.3 parts by weight of methacrylic acid were used in place of 53 parts by weight of acrylamide alone was followed. The paste thus obtained was applied to the same non-bleached kraft paper as Example 1 with the same coating weight to provide a gummed tape.

Example 7

The same procedure as Example 1 except that 47.7 parts by weight of acrylamide and 5.3 parts of ethyl acrylate were used in place of using 53 parts by weight of acrylamide alone was followed. The paste thus obtained was applied to the same non-bleached kraft paper with the same coating weight as the example to provide a gummed tape.

Example 8

The same procedure as Example 1 except that 47.7 parts by weight of acrylamide and 5.3 parts of ethyl methacrylate were used in place of using 53 parts by weight of acrylamide alone was followed. The paste thus obtained was applied to the same non-bleached kraft paper as Example 1 with the same coating weight to provide a gummed tape.

Example 9

The same procedure as Example 3 except that styrene of 10% by weight of acrylic acid was used in place of acrylic acid was followed. The paste thus obtained was applied to the same non-bleached kraft paper as Example 3 with the same coating weight to provide a gummed tape.

Example 10

The same procedure as Example 3 except that ethyl acrylate in an amount of 10% by weight of acrylic acid was used in place of acrylic acid alone was followed. The paste thus obtained was applied to the same non-bleached kraft paper as Example 3 with the same coating weight to provide a gummed paper.

Example 11

The same procedure as Example 4 except that acrylonitrile in an amount of 5% by weight of acrylic acid was used in place of using acrylic acid alone was followed. The paste obtained was applied to the same non-bleached kraft paper as Example 4 with the same coating weight to provide a gummed tape.

Example 12

The same procedure as employed in Example 5 was carried out except that methyl methacrylate in an amount of 5% by weight of the mixture of acrylamide and acrylic acid in the example was used in place of the mixture. The paste thus obtained was applied to the same non-bleached kraft paper as the same example with the same coating weight to provide a gummed tape. Although the present invention has been adequately described in the foregoing specification and examples included therein, it is readily apparent that various changes and modifications can be made without departing from the scope thereof.

What is claimed is:

1. A gummed tape paste having a remoistenable adhesive property, a large initial adhesive strength, a short setting time and a high tack and being capable of being activated at a low temperature comprising the copolymerization product of a vinyl monomer and a hydrolyzed starch, said vinyl monomer being a mixture of a first member selected from the group consisting of acrylamide, acrylic acid and mixtures thereof and not more than about 11% by weight, based on the weight of said first member, of a second member selected from the group consisting of methacrylic acid, methyl acrylate, ethyl acrylate, methyl methacrylate, ethyl methacrylate, acrylonitrile, styrene, ethylene and propylene, said hydrolyzed starch being an enzymatic decomposition product of a starch with a starch hydrolyzing enzyme, the weight ratio of said hydrolyzed starch to said vinyl monomer in said copolymerization product being from 8/1 to 1/1.

2. A process for the continuous production of the gummed tape paste of claim 1 which comprises hydrolyzing starch through enzymatic decomposition by heating the starch and an enzyme capable of hydrolyzing starch, and subsequently copolymerizing said vinyl monomer with the resulting enzyme-hydrolyzed starch in the presence of a free radical polymerization catalyst, wherein the weight ratio of said enzyme-hydrolyzed starch to said vinyl monomer is from 8/1 to 1/1 to thereby provide said copolymerization product.

3. The process of claim 2, wherein said enzyme is a member selected from the group consisting of $\alpha$-amylase and $\beta$-amylase.

4. The gummed tape paste of claim 1, wherein said enzyme is alpha-amylase or beta-amylase.

5. The gummed tape paste of claim 1, wherein said starch is corn, sweet potato, white potato, tapioca or mixtures thereof.

6. The process of claim 2, wherein said copolymerization reaction comprises a free radical polymerization.

7. The process of claim 2 wherein said hydrolysis of said starch is conducted in an aqueous suspension of starch.

8. The process of claim 7, wherein the solution resulting from said starch hydrolysis is directly fed to the copolymerization reaction.

9. The gummed tape paste of claim 1, wherein said copolymerization product is cross-linked by means of a metal compound added to said copolymerization product, said metal compound being selected from the group consisting of magnesium chloride, calcium chloride, lithium chloride and sodium aluminate.

10. The gummed tape paste of claim 9, wherein the amounts of said metal compounds employed are, respectively, based on the weight of said vinyl monomer, 1–10% by weight, 1–10% by weight, 1–10% by weight and 0.1–1% by weight.

11. The process of claim 6 further comprising cross-linking said copolymerization product by adding thereto a member selected from the group consisting of, based on the weight of said vinyl monomer, 1–10% by weight of magnesium chloride, 1–10% by weight of calcium chloride, 1–10% by weight of lithium chloride, and 0.1–1% by weight of sodium aluminate and mixtures thereof and reacting said member with said copolymerization product to obtain a cross-linked copolymerization product.

12. The gummed tape paste of claim 1, wherein the COOH functional group of said acrylic acid or the $CONH_2$ functional group of said acrylamide or both are partially neutralized with an alkali metal, an alkaline earth metal or ammonia to form an alkali metal, an alkaline earth metal or an ammonia salt of said copolymerization product.

13. The process of claim 2, wherein, subsequent to said copolymerization reaction, a portion of the COOH functional group of said acrylic acid or the $CONH_2$ functional group of said acrylamide or both are neutralized with an alkali metal, an alkaline earth metal or ammonia to form an alkali metal salt, an alkaline earth metal salt or an ammonium salt of said copolymerization product.

References Cited
UNITED STATES PATENTS

| | | | |
|---|---|---|---|
| 3,061,472 | 10/1962 | Brockway et al. | 117—139.5 |
| 3,377,302 | 4/1968 | Gugliemelli, et al. | 260—17.4 |
| 3,368,987 | 7/1968 | Pollart et al. | 260—17.4 |

LESTER L. LEE, Primary Examiner

U.S. Cl. X.R.

117—122 PA; 195—30; 260—17.4 GC